Oct. 13, 1936.  J. GSTYR  2,057,302
METHOD AND MACHINE FOR LAPPING CUTTER BLADES
Filed Dec. 24, 1932.  2 Sheets-Sheet 2
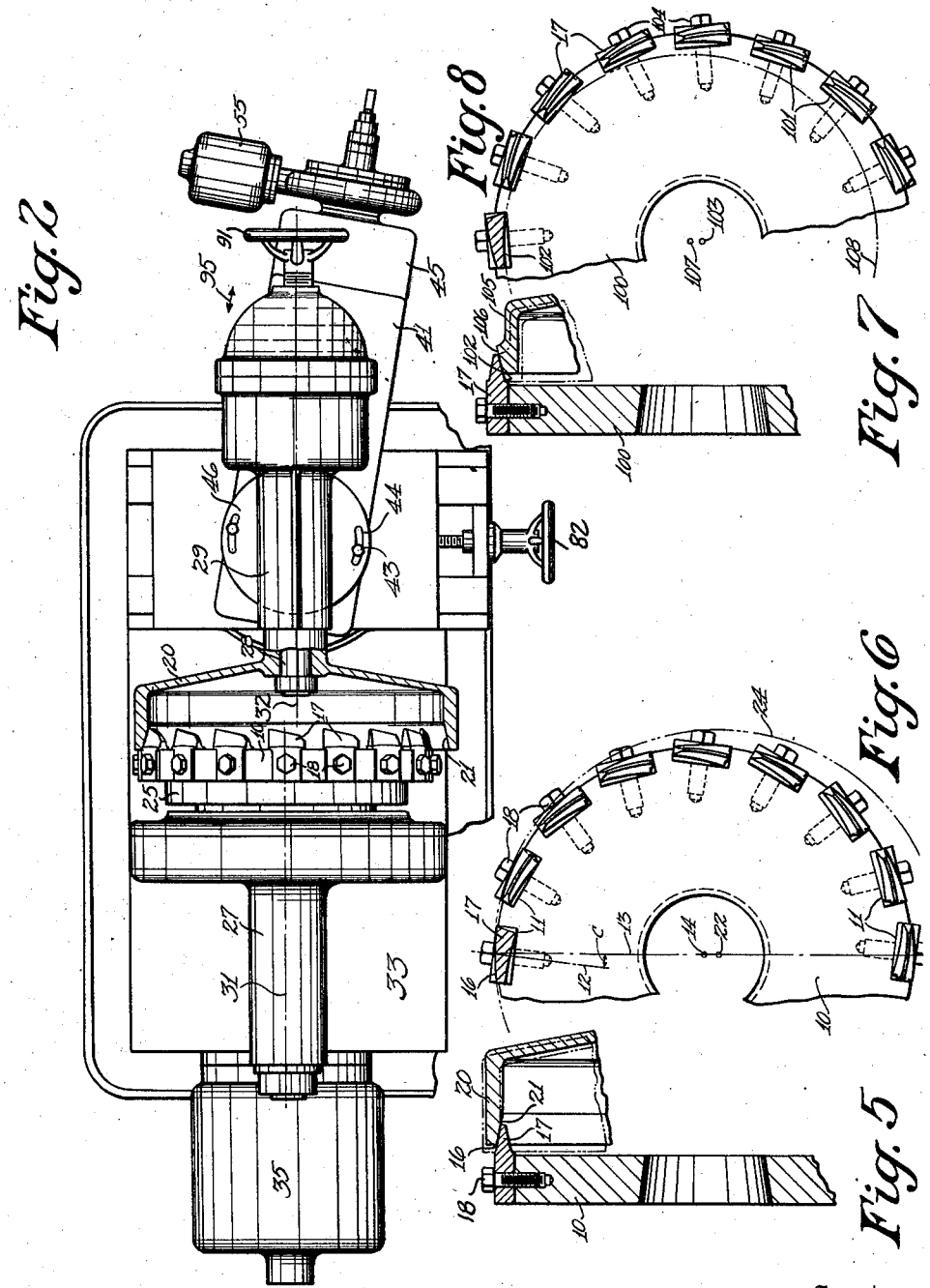
Inventor
Joseph Gstyr
By
R. V. Schlesinger
Attorney Patented Oct. 13, 1936

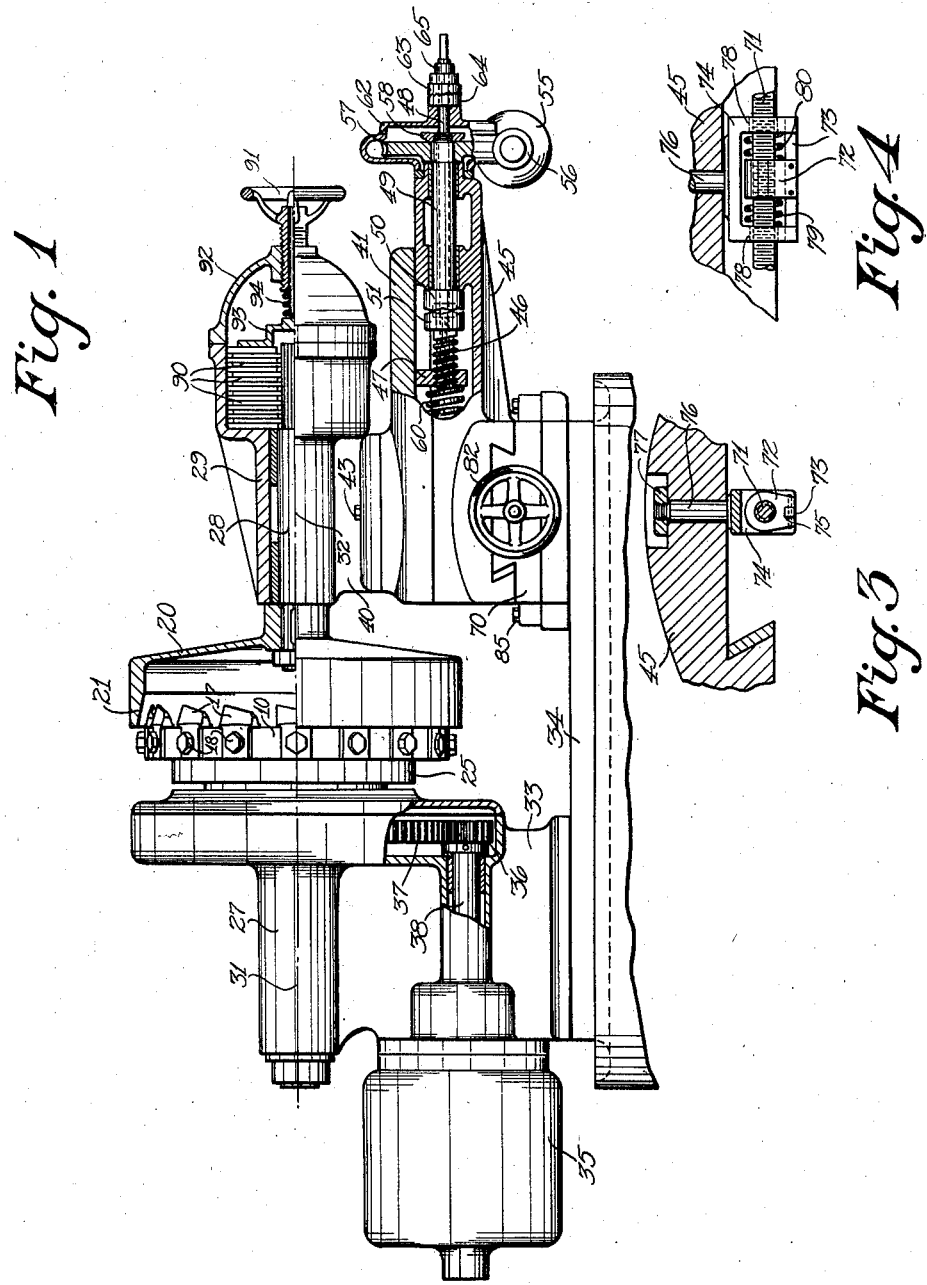

2,057,302

UNITED STATES PATENT OFFICE 2,057,302

METHOD AND MACHINE FOR LAPPING CUTTER BLADES

Joseph Gstyr, Rochester, N. Y., assignor to Gleason Works, Rochester, N. Y., a corporation of New York Application December 24, 1932, Serial No. 648,760

16 Claims. (Cl. 51—278)

The present invention relates to the lapping of cutter blades and particularly to the lapping of the side surfaces of blades of a face-mill gear cutter.

The blades of face mill gear cutters have heretofore been finished by grinding. The purpose of the present invention is to provide a commercially practical process for lapping them with the object of producing blades whose side surfaces are smoother than ground surfaces and to improve the cutting accuracy of the blades.

The invention comprises a process for lapping cutter blades and a novel machine for practicing that process.

In the method of the present invention, the two sides of the cutter blades are lapped separately. To lap either side of the blades, they are arranged in a rotary head so that the particular sides to be lapped, whether outside or inside, lie in the same surface, preferably a surface of revolution coaxial with the head. A lap is used which has an operating surface that contacts with the surface in which the sides of the blades lie and that has a profile complementary to the profile of the cutting surfaces which are being lapped. The lapping operation is effected by rotating the lap and head together while applying an abrasive medium at the point of contact of the lap and blades.

The blades of face mill gear cutters are provided with cutting clearance back of their cutting edges. Hence, in order to have corresponding side surfaces of a plurality of these blades lie in the same surface, the blades must be arranged in the lapping head in positions oblique to the positions they occupy when cutting.

The face mill cutter blades commonly used have straight side cutting edges. The laps used to lap such blades will have, therefore, straight profiled operating surfaces which will be either conical or cylindrical depending upon whether the sides of the blades being lapped have a positive or a zero pressure angle. Laps used in the present process are made, preferably, of a diameter sufficiently different from the diameter of the surface in which the sides of the blades lie that the lap and blades will have theoretically only line contact. The operating surface of the lap may be kept trued, then, during the lapping operation, by producing a slight reciprocating motion between the lap and blade-carrying head in the direction of the line of contact between the lap and the blades.

For finishing the outside surfaces of blades an internal lap is used and for finishing the inside surfaces of blades an external lap is used. The laps may be driven frictionally by reason of their contact with the side surfaces of the blades or both the laps and the blade-carrying head may be positively rotated in engagement.

The principal objects of the invention have been mentioned, but other objects of the invention will be apparent hereinafter from the specification and from the recital of the appended claims.

In the drawings:

Figure 1 is a side elevation, with parts broken away, showing a preferred embodiment of a machine built for practicing the present invention;

Figure 2 is a plan view of this machine with the lap member shown in section;

Figure 3 is a fragmentary sectional view illustrating the connection between the transverse adjusting screw and the slide adjusted thereby;

Figure 4 is a fragmentary sectional view taken at right angles to Figure 3;

Figures 5 and 6 are a fragmentary sectional and a fragmentary elevational view, respectively, illustrating diagrammatically the manner in which the lap and blades contact in the lapping of the outside surfaces of a set of face mill cutter blades; and Figures 7 and 8 are corresponding views, respectively, illustrating the contact between a lap and the blades in the lapping of the inside surfaces of a set of face mill cutter blades.

In Figure 6, there is shown a head 10 such as may be employed in the lapping of the outside surfaces of a set of face mill cutter blades. This head is provided with a plurality of rectangular slots 11 which are adapted to receive the shanks of the cutting blades 17. The slots 11 are cut obliquely in the head 10 and the angle c between the center line 12 of each slot and a line 13, which is radial of the axis 14 of the head, corresponds to the angle of clearance desired on the outside surfaces 16 of the blades.

In the illustrated case, the blades have outside surfaces of a positive pressure angle, that is, outside surfaces which are inclined to the axis 14 of the head. When positioned in the head 10, then, the outside surfaces 16 of the blades 17 lie in a conical surface coaxial with the head 14. The blades are secured in the slots 11 by bolts 18.

The lapping of the outside surfaces 16 of the blades 17 is effected with a lap member 20 having an internal lap surface 21 which is shaped to fit the outside surfaces of the blades 17 when the blades are positioned as described in the lapping head 10. Thus, the operating surface 21 of the lap has, in the embodiment shown, a straight profile complementary to the profile of the outside surfaces 16 of the blades and a conical surface conjugate to the conical surface in which the blades lie. The lap member 20 is preferably made so that the diameter of its lapping surface 21 will be larger than the diameter of the conical surface in which the outside surfaces of the blades lie and hence, the operating surface 21 of the lap will have theoretically only line contact with the outside surfaces 16 of the blades. In other words, the operating surface 21 is preferably formed as part of a cone which has a cone radius greater than the radius 13 and which has its axis 22 offset from the axis 14 of the head 10.

When the lap and blades are in operative relation, the internal conical operating surface 21 of the lap will contact with the conical surface in which the outside surfaces 16 of the blades lie along the straight line profile of the blades. The manner of contact between the operating surface of the lap and the outside surfaces of the blades is illustrated in Figures 5 and 6. In Figure 6, the dotted line 24 denotes a line in the operating surface 21 of the lap and lying in the plane of section of the blade which is shown in section in this figure.

To lap the outside surfaces 16, the head 10 and lap 20 are rotated together while applying an abrasive medium to them. To keep the surface of the lap true, it is preferred to impart a reciprocating motion also between the head and blades in the direction of their line of contact as they rotate together. In Figure 5, this reciprocating truing motion is shown as imparted to the lap, two positions of the lap, as it reciprocates, being shown in dotted and in full lines, respectively, in this figure.

Figures 1 and 2 show a machine built for lapping cutter blades according to this invention as arranged for lapping of outside surfaces of a set of blades. The lapping head 10 is secured in any suitable manner to the head 25 of a spindle which is journaled in a bearing 27. The lap 20 is secured in any suitable manner to a spindle 28 which is journaled in a bearing 29.

The bearing 27 is part of an upright 33 which is secured to and formed integral with the base 34 of the machine. The head 10 is driven from the motor 35 through the gears 36 and 37. The motor is secured in any suitable manner to the upright 33 and the gear 36 is fastened to the shaft 38 which is journaled in the upright and is coupled to the armature shaft of the motor. The gear 37 is secured in any suitable manner to the spindle on which the head 10 is mounted.

The bearing 29 is part of a carrier 40 which is adjustable angularly upon a slide 41. This carrier is secured in any position of its adjustment on the slide by bolts 43 which pass through arcuate slots 44 in the carrier and thread into the slide.

The slide 41 is adjustably and reciprocably mounted on a carriage 45. 46 designates a screw which threads into a lug 47 that is secured in the underside of the slide 41. The screw 46 is integral with a shaft 48 that is rotatably adjustable in a sleeve 49.

The sleeve 49 is journaled in the carriage 45. On one end of this sleeve there is an integral cam member 50. This cam member cooperates with a cam member 51 that is secured to the screw shaft 48. The two cam members 50 and 51 have contacting serrated faces so arranged that as the sleeve 49 rotates, a reciprocating motion will be imparted to the slide 41 through the cam 51, screw 46 and lug 47.

The sleeve 49 is rotated continuously during the operation of the machine from a motor 55. This motor drives the worm 56 which meshes with a worm wheel 57 that is keyed to the shaft 49 and is held thereon by the nut 58. A coil-spring 60 that is interposed between a lug (not shown) on the carriage 45 and the lug 47 serves to maintain the face of the cam 51 in contact with the face of the cam 50.

The screw shaft 48 is journaled at its outer end in a guard 62 which is secured in any suitable manner to the carriage 45. The motor 55 is mounted upon this guard. The screw shaft 48 carries one member 63 of a face clutch. The other member 64 of this clutch is pinned to the guard 62. A nut 65, that threads on the shaft 48, serves to hold the clutch members engaged. When the nut 65 is unthreaded, the clutch members can be disengaged and the shaft 48 can be rotated to adjust the slide 41 on the carriage 45. When the clutch members are engaged again, rotation of the worm wheel 57 will impart a reciprocating motion to the slide 41 through the cams 50 and 51, as described.

The carriage 45 is mounted for transverse adjustment upon a plate 70. It is also preferably mounted so as to be yieldably movable thereon. In the preferred construction, illustrated in the drawings, there is a screw shaft 71 rotatably mounted in the plate 70. This shaft 71 threads into a nut 72. The nut 72 is slidable with reference to a U-shaped member 74, but is held against rotation by a bar 73 which is secured to the nut and which engages in notches 75 cut in the outer ends of the arms of the U-shaped member 74. The member 74 is integral with a stud 76 which is secured in the carriage 45 by a nut 77. The arms of the U-shaped member 74 are provided with enlarged openings 78 through which the screw shaft 71 can pass. There are a pair of coil springs 79 and 80 interposed between the nut 72 and the two arms, respectively, of the U-shaped member 74.

The construction just described is such that when the screw shaft 71 is rotated by the handwheel 82, the carriage 45 is adjusted on the plate 70 so that the movement of the nut 72 will be transmitted through one or other of the springs 79 or 80 to the U-member 74 and thence to the carriage 45. The springs 79 and 80 allow of a certain yielding movement of the carriage 45 for a purpose which will hereinafter appear.

The plate 70 is adjustable angularly upon the frame or base 34 of the machine. It is secured in any position of its angular adjustment by bolts 85 which pass through arcuate slots (not shown) in the plate 70 and which thread into the base 34.

In lapping a set of cutter blades, the lapping head and lap may be independently driven or, as I have illustrated in the drawings, the lap may be frictionally driven from the rotary blade-carrying head. The spindle 28, to which the lap is secured, is splined at its inner end and it carries alternate members of a multiple disc-clutch 90, the cooperating alternate members of which are secured within the bearing member 29. The frictional load on this clutch can be adjusted by rotation of the handwheel 91. This handwheel has a stem that threads into a guard 92 which is secured in any suitable manner to the bearing member 29. There is a plate 93 slidable in the guard 92 and suitably guided in its movement therein, and between this plate and the inner end of the stem of the handwheel 91 there is interposed a coil-spring 94. Hence, when the handwheel is adjusted, the load on the disc clutch or brake 90 is adjusted and the disc clutch or brake operates to apply a yielding frictional load on the spindle 28, resisting rotation of that spindle.

To use the machine described for the lapping of the outside surfaces of a set of cutter blades, the blades are positioned obliquely in the head 10 so that the outside surfaces all lie in the same surface of revolution coaxial with the head, as above described, and the head 10 is mounted upon the head 25 of the work spindle of the machine. An internal lap 20 is then mounted upon the spindle 28 and the lap adjusted into operative position. To this end, the plate 70 is first adjusted angularly on the base 34 in order to position the carriage 45 and slide 41 so that the slide 41 will reciprocate in a direction parallel to the line of contact between the lapping surface 21 and the outside surfaces 16 of the cutting blades. The desired direction of this movement is indicated by the arrow 95 in Figure 2. The carriage 45 is then adjusted on the plate 70 by rotation of the handwheel 82 to bring the lap into side-contact with the outside surfaces of the blades. Then the nut 65 is loosened to permit disengagement of the clutch members 63 and 64 so that the lapping surface of the lap may be adjusted to cover the full height of the blade-surfaces to be lapped. After the latter adjustment, the clutch members 63 and 64 are reengaged. The carrier 40 is then adjusted angularly on the slide 41 to bring the axis of the lap member 20 into parallelism with the axis of the rotary head 10. The proper amount of frictional load is applied to the lap member by manipulating the handwheel 91.

When these various adjustments have been made, the machine is ready for operation and the operator starts the motors 35 and 55. The motor 35 drives the rotary head 10 through the gears 36 and 37 and the head drives the lap member 20 through the frictional engagement between the outside surface of the cutter blades and the lap surface 21. As the head and lap rotate together, the cam 50, which is driven from the motor 55 through the worm 56 and wormwheel 57, imparts a reciprocating truing movement to slide 41 through the cam 51, screw 46 and lug 47. This reciprocating movement, because of the direction of adjustment of the slide 41, takes place along the line of contact between the lapping surface 21 and the outside surfaces of the cutting blades so that as the lap rotates, it is moved back and forth in the direction of its line of contact, as illustrated in Figure 5.

A lapping compound, such as a mixture of oil and abrasive, is, of course, applied between the lap and the blades during the lapping operation. This lapping compound may be applied in any suitable manner, as by a brush, air, etc.

The springs 79 and 80 permit of a certain yielding sidewise movement of the lap, so that if any of the blades are of excessive thickness, which would make them project beyond other blades in the head 10, the lap would move enough to prevent these projecting blades from gouging into the lapping surface 21. The lapping operation is continued long enough to produce the desired finish on the blades and to make them identical.

The inside surfaces of the set of blades may be lapped upon this same machine and in a process similar to that described. A different blade-carrying head from the head 10 must be used and an external instead of an internal lap employed.

The head 100 used in lapping the inside surfaces of the blades differs from the head 10 in that the slots 101 of the head 100 are directed oppositely to the slots 11 of the head 10. The slots 101 are cut in the head 100 so as to permit the blades 17 to be positioned obliquely in the head at an angle such that the inside surfaces 102 of the blades will all lie on a surface of revolution coaxial with the axis 103 of the head. The angle of obliquity of the slots 101 will depend, as before, upon the amount of cutting clearance desired on the inside surfaces of the blades. The blades may be secured in the head 100 by bolts 104.

A lap for lapping inside surfaces of a set of blades is designated at 105. It has an external lapping surface 106 which in the instance shown is conical since the inside surfaces 102 of the blades are of positive pressure angle. The lapping member 105 is preferably of a diameter less than the diameter of the surface of revolution which contains the inside surfaces 102 of the blades when the blades are secured in the head 100. In this case, the axis 107 of the lap member will be eccentric of the axis 103 of the head 100. The dotted line 108 indicates the intersection of a plane perpendicular to the axis of the lap with the lapping surface 106. One of the blades 17 is shown in section in this same plane. As is seen the lap and inside blades of the cutter head contact in a manner similar to a pair of internal gears.

To lap the inside surfaces of the plates, the head 100 is secured upon the head 25 of the work spindle of the machine and the lap 105 is secured upon the spindle 28. The parts of the machine are adjusted to bring the lap and blades into operative relation and to provide a reciprocating, truing movement of the slide 41 in the direction of the line of contact between the lap 105 and the inside surfaces 102 of the cutting blades. Two positions of the lap 105, in its reciprocating movement, are indicated in dotted and in full lines, respectively, in Figure 7. The lapping operation is effected, as before, by rotating the lap 105 and head 100 together and by simultaneously producing the reciprocating movement described.

While the laps 20 and 105 have, respectively, theoretically only line contact with the surfaces that are being lapped, in use, this line of contact will spread out and there will be an area of contact between the lap and the surfaces of the cutting blades so that the lapping operation will be completed quite rapidly.

The lap used may be made of cast-iron or of any other suitable material.

The present invention has wide application. So, it may be used for lapping blades of face mill gear cutters of the hobbing or continuous indexing type as well as of the intermittent indexing type. The blades to be lapped, moreover, need not be positioned obliquely in the lapping heads. They may be positioned radially therein. The only requirement is that the positions of the blades during lapping be different from their positions during cutting so that the proper cutting clearance angle may be preserved during the lapping of the side surfaces of the blades and the corresponding side surfaces of a set of blades may be lapped by a lap member having a lapping surface which will contact one side surface of all the blades.

In the drawings, the invention is shown as applied to blades whose side cutting edges are of positive pressure angle. It will be understood, however, that it is equally applicable to blades whose side cutting edges are of zero pressure angle. In this latter case, the laps used will be cylindrical to fit the cylindrical surfaces in which the blade surfaces lie.

While the invention has been disclosed in connection with particular embodiments thereof, it will be understood that it is capable of various further modifications and that this application is intended to cover any adaptations, uses, or embodiments of the invention following, in general, the principles of the invention, and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of lapping side surfaces of face mill gear cutter blades whose side surfaces are relieved eccentrically of the axis of the cutter, which comprises positioning a plurality of blades in a rotary head so that the blades project beyond one side face of the head in the general direction of the axis of the head and are arranged non-radially of the axis of the head so that corresponding side surfaces of the blades are inclined sidewise to the positions they occupy in cutting and lie in a surface of revolution coaxial with the head, positioning a rotary member having an annular lapping surface projecting in the general direction of its axis and of a profile shape complementary to the profile shape of the said side surfaces of the blades to be lapped and whose radius is different from the radius of the surface of revolution in which the said side surfaces of the blades lie, in operative engagement with said blades so that said lapping surface engages said side surfaces of the blades with the axis of the lapping member offset from but parallel to the axis of the head, and rotating the lapping member and head on their axes while imparting a reciprocating movement to the lap member in the direction of a line of contact between the lap member and the said side surfaces of the blades.

2. The method of lapping side surfaces of face-mill gear cutter blades which have side surfaces relieved eccentrically of the axis of the cutter which comprises positioning a plurality of blades obliquely in a rotary head with the blades projecting beyond one side face of the head in the general direction of the axis of the head so that corresponding relieved side surfaces of the several blades are inclined sidewise to the positions they occupy in cutting and lie in a surface of revolution coaxial with the head, positioning a lap member, which has an arcuately curved operating surface shaped to fit said surface of revolution and to have line contact with the same, in engagement with the blades, and rotating the head on its axis while imparting movement in a curved path to the lap member and producing a relative reciprocating movement between the head and lap member along a line of contact between the lap member and the said corresponding sides of the blades.

3. A machine for lapping relieved side surfaces of face mill gear cutter blades comprising a rotary head adapted to carry a plurality of blades with the blades projecting in the general direction of the axis of the head and arranged so that corresponding relieved side surfaces of the blades will lie in a surface coaxial of the head, a lap member having an annular lapping surface whose profile shape is complementary to the profile shape of the side surfaces of the blades and whose diameter is different from the diameter of the surface in which the said corresponding side surfaces of the blades lie, means for rotating the lap member and head on their respective axes, and means for simultaneously producing a reciprocating movement between the head and lap member in the direction of a line of contact between the lapping surface and the surfaces of the blades.

4. A machine for lapping relieved side surfaces of face mill gear cutter blades comprising a rotary head adapted to carry a plurality of blades with the blades projecting in the general direction of the axis of the head and arranged so that corresponding relieved side surfaces of the blades lie in a surface coaxial of the head, a lap member having an annular lapping surface whose profile shape is complementary to the profile shape of the side surfaces of the blades and whose diameter is different from the diameter of the surface in which said corresponding side surfaces of the blades lie, a slide on which one of said members is mounted, a frame on which the slide is reciprocable and in which the head and lap member are rotatable, means for adjusting the slide so that it moves in a direction parallel to a line of contact between the operating surface of the lapping member and said corresponding side surfaces of the blades, means for rotating the head and lap on their respective axes, and means for simultaneously reciprocating said slide.

5. The method of lapping face-mill gear cutter blades which project from one side face of the cutter in the general direction of the axis of the cutter and which have side cutting edges inclined to the axis of the cutter and side surfaces relieved back of said cutting edges to lie in surfaces eccentric of the cutter axis, said method comprising positioning a plurality of said blades in a rotary head so that the blades project beyond a side face of the head in the general direction of the axis of the head and are so arranged non-radically of the axis of the head that corresponding relieved side surfaces of the several blades lie in a conical surface coaxial of the head, engaging with said blades a lap which has an annular conical lapping surface whose axis is parallel to the axis of the head and which is of the same cone angle but of different cone radius from the conical surface in which the blades lie, and rotating the lap and head together on their respective axes, in conformity to two eccentrically located circles rotating one within the other.

6. The method of lapping face-mill cutter blades which project from one side face of the cutter in the general direction of the axis of the cutter and which have side cutting edges inclined to the axis of the cutter and side surfaces relieved back of said cutting edges to lie in surfaces eccentric of the cutter axis, said method comprising positioning a plurality of said blades in a rotary head so that the blades project beyond a side face of the head in the general direction of the axis of the head and corresponding relieved side surfaces of the several blades lie in a conical surface coaxial with the head, engaging with said blades a lap which has a conical lapping surface of the same cone angle but of different cone radius from the conical surface in which the blades lie, and rotating the lap and head together in conformity to two eccentrically located circles while imparting a relative reciprocating movement between the lap and head in the direction of a line of contact between the head and lap.

7. A machine for lapping relieved side surfaces of the blades of a face-mill gear cutter which project beyond one side face of the head of the cutter in the general direction of the axis of the cutter and have cutting edges inclined, in use, to the axis of the cutter and side surfaces relieved back of said cutting edges and lying in surfaces eccentric of the axis of the cutter, said machine comprising a rotary head adapted to carry a plurality of said blades with the blades projecting beyond one side face of the head in the general direction of the axis of the head and with the blades arranged non-radially of the axis of the rotary head so that corresponding side surfaces of the blades arranged to lie in a conical surface coaxial of the head, a lap member having a conical lapping surface of the same cone angle as the conical surface in which the blades lie but of a different cone radius, means for positioning the lap and blades in engagement with the axis of the lap parallel to but offset from the axis of the blade-carrying head, and means for simultaneously rotating the head and lap on their respective axes in the manner of two eccentrically located circles which are rotating one within the other.

8. A machine for lapping relieved side surfaces of the blades of a face-mill gear cutter which project beyond one side face of the head of the cutter in the general direction of the axis of the cutter and have cutting edges inclined, in use, to the axis of the cutter and side surfaces relieved back of said cutting edges and lying in surfaces eccentric of the axis of the cutter, said machine comprising a rotary head adapted to carry a plurality of said blades with the blades projecting beyond one side face of the head in the general direction of the axis of the head and with corresponding side surfaces of the blades arranged so as to lie in a conical surface coaxial of the head, a lap member having a conical lapping surface of the same cone angle as the conical surface in which the blades lie but of a different cone radius, means for positioning the lap and blades in engagement with the axis of the lap parallel to but offset from the axis of the blade-carrying head, means for rotating the head and lap on their respective axes, and means for simultaneously producing a relative reciprocating movement between the head and lap along a line inclined to the axes of said conical surfaces and constituting a line of contact between the blades and the lap.

9. The method of lapping side surfaces of face mill gear cutter blades which comprises mounting a plurality of said blades around the periphery of a rotary head with the blades projecting beyond one side face of the head in the general direction of the axis of the head and so that the side surfaces at one side of the blades lie in a surface of revolution coaxial of the head, positioning a rotary lapping member, which has an annular lapping surface so shaped to fit said surface of revolution that one surrounds the other and which has a profile shape complementary to the profile shape of the said side surfaces of the blades, in engagement with the blades with the axis of the lapping member extending parallel to but offset from the axis of said head and rotating the lapping member and head on their axes in conformity with two eccentric circles rotating one within the other.

10. The method of lapping side surfaces of face mill gear cutter blades which comprises mounting a plurality of said blades around the periphery of a rotary head with the blades projecting beyond one side face of the axis of the head and so that the side surfaces at one side of the blades lie in a surface of revolution coaxial of the head, positioning a lapping member, which has an arcuate lapping surface so shaped to fit said surface of revolution that one surrounds the other and which has a profile shape complementary to the profile shape of the said side surfaces of the blades, in engagement with the blades, and producing relative rotational motion between said lapping member and the head about the axis of the head.

11. The method of lapping side surfaces of face mill gear cutter blades which in use are adapted to be mounted radially of the cutter axis and to project beyond one side face of the cutter head, which comprises mounting said blades around the periphery of a rotary head so that they project beyond one side face of the rotary head and are arranged non-radially of the axis of said rotary head with the side surfaces of one side of the blades lying in a surface of revolution coaxial of said head, positioning a lapping member, which has an arcuate lapping surface adapted to fit said surface of revolution, in engagement with the blades and rotating the rotary head on its axis while rotating the lapping member about an axis passing through the center of its lapping surface and parallel to the axis of the rotary head.

12. The method of lapping side surfaces of face mill gear cutter blades which in use are adapted to be mounted radially of the cutter axis and project beyond one side face of the cutter head which comprises mounting said blades around the periphery of a rotary head so that they project beyond one side face of the rotary head and are arranged non-radially of the axis of said rotary head with the side surfaces of one side of the blades lying in a surface of revolution coaxial of said rotary head, positioning a lapping member which has an annular lapping surface of a profile shape complementary to the profile shape of the said side surfaces of the blades and of a radius different from the radius of said surface of revolution, in engagement with said blades so that said lapping surface engages said side surfaces with the axis of the lapping member offset from but parallel to the axis of the head, and rotating the lapping member and head on their axes in conformity with two eccentrically related circles rotating one within the other.

13. The method of lapping side surfaces of face mill gear cutter blades, which in use are adapted to be mounted in a cutting head with their side surfaces inclined to a surface of revolution coaxial with the cutting head and projecting beyond one side face of the cutting head, which comprises mounting said blades around the periphery of a rotary head so that they project beyond one side face of the head and are arranged non-radially of the axis of the rotary head so that the side surfaces at one side of the blades lie in a surface of revolution coaxial of the rotary head, positioning a rotary lapping member, whose profile shape is complementary to the profile shape of the said side surfaces of the blades and whose radius is different from the radius of said surface of revolution, in operative engagement with the blades with its axis offset from but parallel to the axis of the head, and rotating the lapping member and head on their axes in conformity with two eccentrically related circles rotating one within the other.

14. The method of lapping side surfaces of face mill gear cutter blades which comprises mounting a plurality of said blades around the periphery of a rotary head with the blades projecting beyond one side face of the head in the general direction of the axis of the head and so that the side surfaces at one side of the blades are inclined sidewise to the positions which they occupy during cutting and lie in a surface of revolution coaxial with the head, positioning a lap member, which has an arcuately curved operating surface so shaped to fit said surface of revolution that one surrounds the other and so shaped also as to have line contact with the blades, in engagement with the blades, and rotating the head on its axis while imparting movement in a curved path to the lap member about an axis parallel to the axis of said head.

15. The method of lapping side surfaces of face mill gear cutter blades which comprises mounting a plurality of blades in a circle about the axis of the head with the blades projecting beyond one side face of the head in the general direction of the axis of the head and arranged non-radially of the axis of the head so that the side surfaces at one side of the blades are inclined sidewise to the positions which they occupy during cutting and are arranged in a surface of revolution coaxial with the head, positioning a rotary lap member, which has an annular lapping surface projecting in the general direction of its axis and of a profile shape complementary to the profile shape of said surface of revolution but of a radius different from the radius of said surface of revolution, in engagement with the blades with the axis of said lap member extending parallel to the axis of said head, and rotating the head and lap on their respective axes in conformity to two eccentrically related circles rotating one within the other.

16. A machine for lapping the side surfaces of face mill gear cutter blades comprising a frame, a rotary head journaled in the frame and adapted to carry a plurality of blades with the blades arranged non-radially of the axis of the head and projecting beyond one side face of the head in the general direction of the axis of the head so that side surfaces at one side of the blades lie in a surface of revolution coaxial with the head, a rotary lap member journaled in the frame with its axis extending parallel to the axis of said head and having an annular lapping surface whose profile shape is complementary to the profile shape of the side surfaces of said blades and whose diameter is different from the diameter of the surface in which the described surfaces of the blades lie, and means for rotating the lap member and head on their respective axes in conformity to two eccentrically related circles rotating one within the other.

JOSEPH GSTYR.